United States Patent [19]

Shiraogawa et al.

[11] 4,314,332

[45] Feb. 2, 1982

[54] MEMORY CONTROL SYSTEM

[75] Inventors: Yukio Shiraogawa, Kunitachi; Keizo Aoyagi, Fuchu, both of Japan

[73] Assignee: Tokyo Shibaura Denki Kabushiki Kaisha, Kawasaki, Japan

[21] Appl. No.: 20,021

[22] Filed: Mar. 13, 1979

[30] Foreign Application Priority Data

Mar. 15, 1978 [JP] Japan .................................. 53-29404

[51] Int. Cl.³ ............................................. G06F 9/06
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,778,776 | 12/1973 | Hakozaki | 364/200 |
| 3,953,835 | 4/1976 | Cuccio et al. | 364/200 |
| 3,955,180 | 5/1976 | Hirtle | 364/200 |
| 4,087,854 | 5/1978 | Kinoshita et al. | 364/200 |
| 4,122,531 | 10/1978 | Tamaru et al. | 364/900 |

OTHER PUBLICATIONS

Flores, I., Computer Organization, 1969, pp. 252-257.

*Primary Examiner*—Gareth D. Shaw
*Assistant Examiner*—Thomas M. Heckler
*Attorney, Agent, or Firm*—Kenyon & Kenyon

[57] ABSTRACT

Disclosed is a memory control system for a data processing system in which the length of an access unit to a memory can be different from the lengths of information words which can be processed and which can include data, addresses, and instructions and operands processed in an arithmetic control apparatus, and combinations thereof. The disclosed memory control system provides an address boundary for effecting a read/write operation with respect to the memory of information words having a half-word length and a full-word length. The half-word length information words can correspond to 2n times a minimum word length, n being a positive integer, and the access unit length can be equal to the minimum unit word length. In a disclosed embodiment, the minimum unit word length and the access unit length can be an 8 bit byte. Thus, a half-word length can be 16 bits and a full-word length can be 32 bits.

8 Claims, 31 Drawing Figures

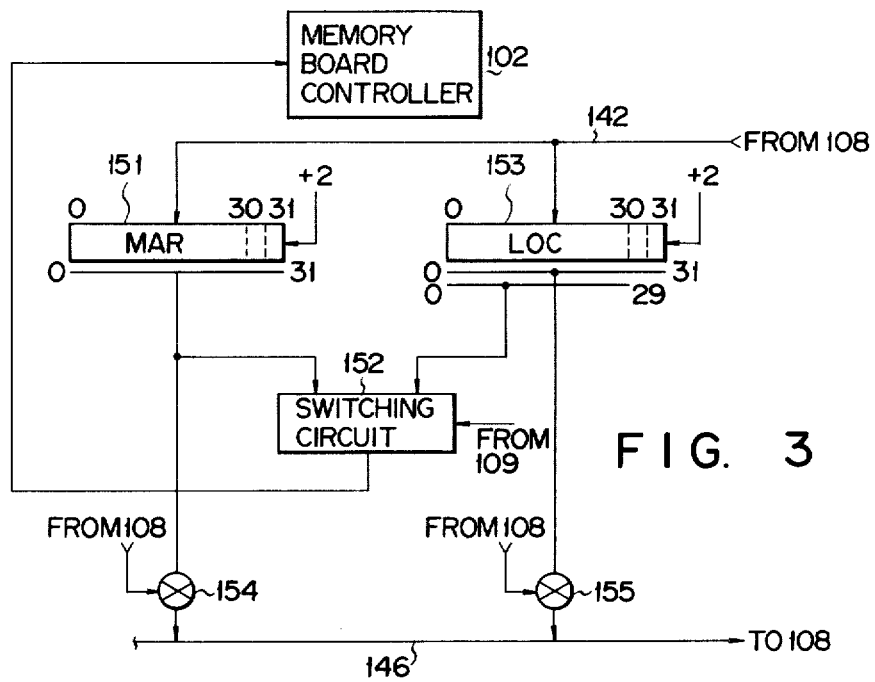
FIG. 3
FIG. 5A (TYPE 1) 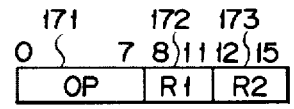
FIG. 5B (TYPE 2) 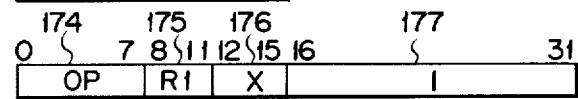
FIG. 5C (TYPE 3) 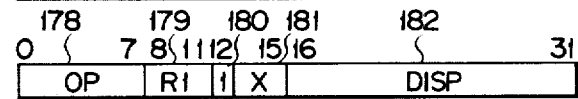
FIG. 5D (TYPE 4) 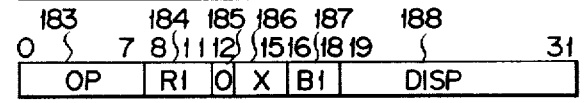
FIG. 6A BYTE DATA 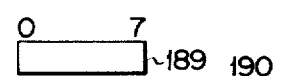
FIG. 6B HALF WORD DATA 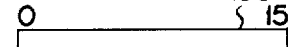
FIG. 6C FULL WORD DATA 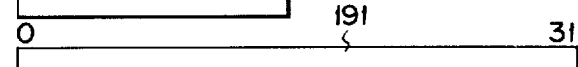

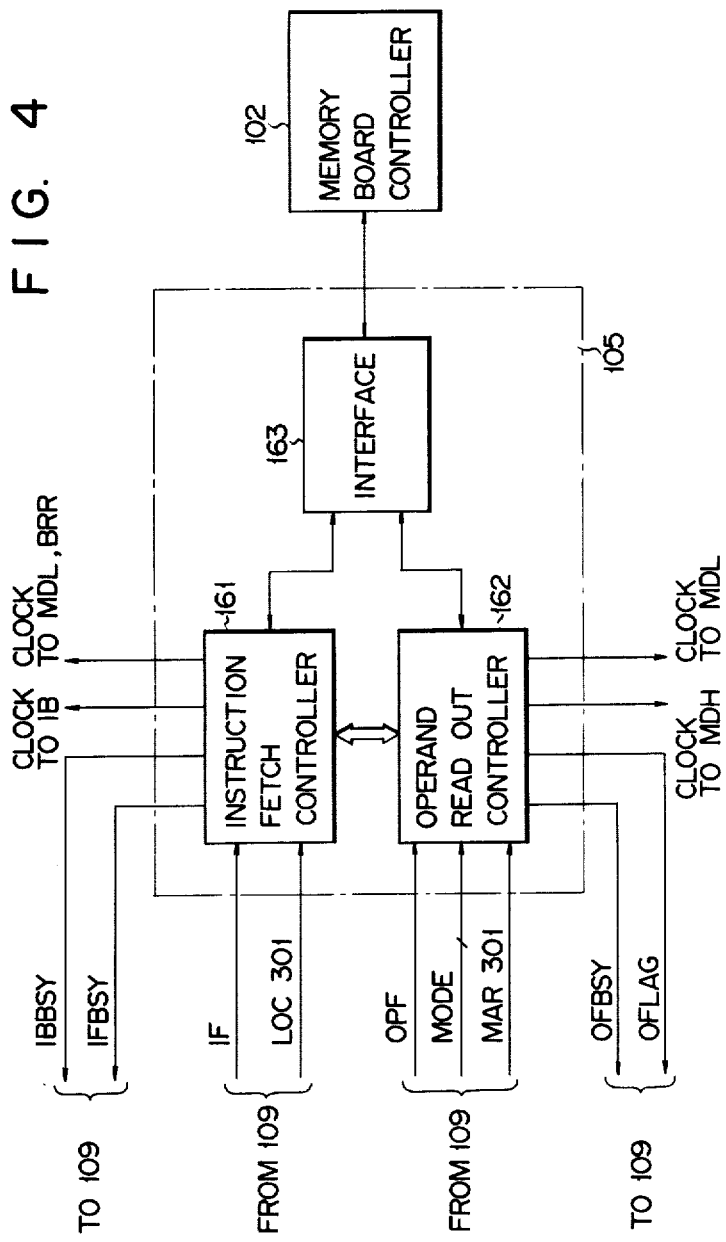

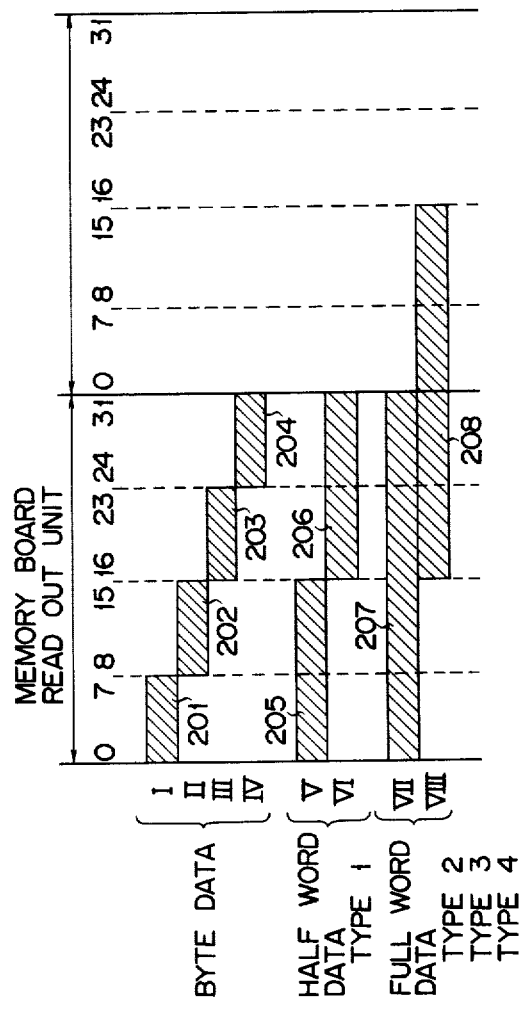

FIG. 8A  FULL WORD READ OUT   FIG. 8B
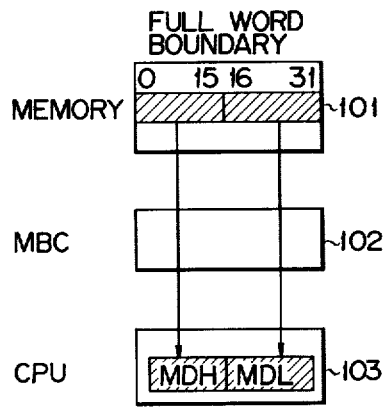
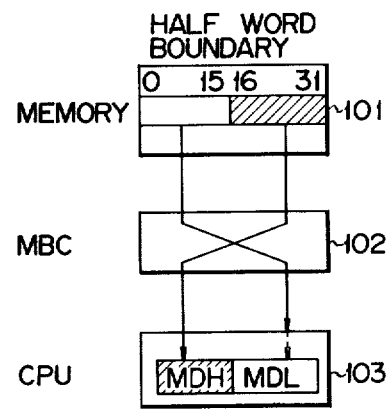
FIG. 8C  HALF WORD READ OUT   FIG. 8D
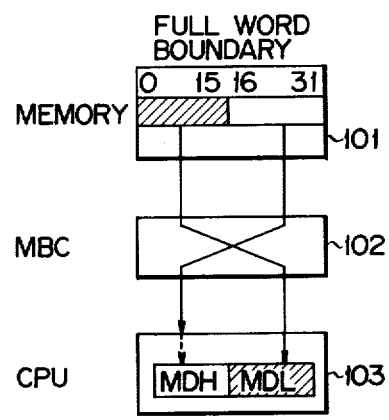
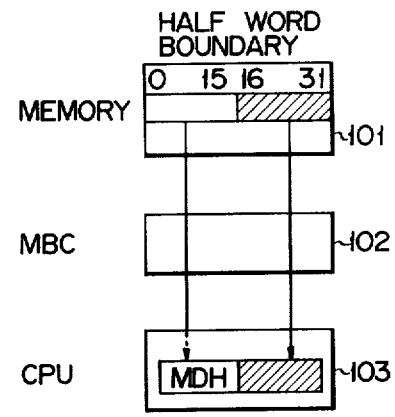

FIG. 8E  FULL WORD WRITE IN  FIG. 8F
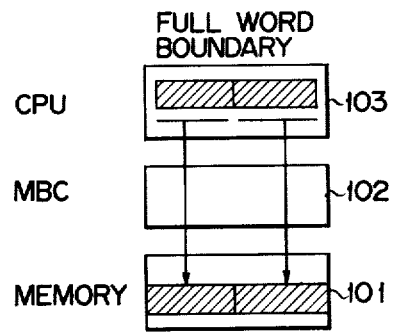
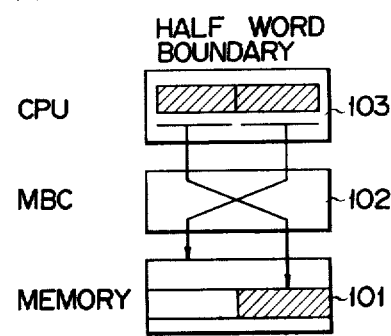
FIG. 8G  HALF WORD WRITE IN  FIG. 8H
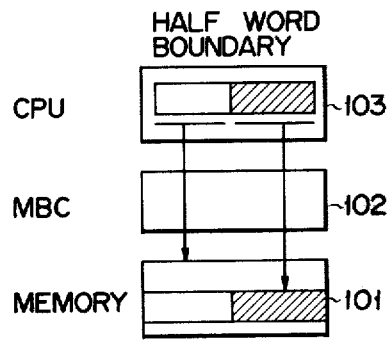
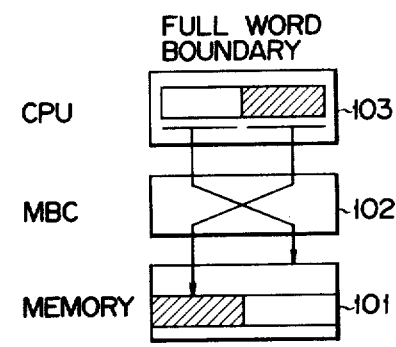

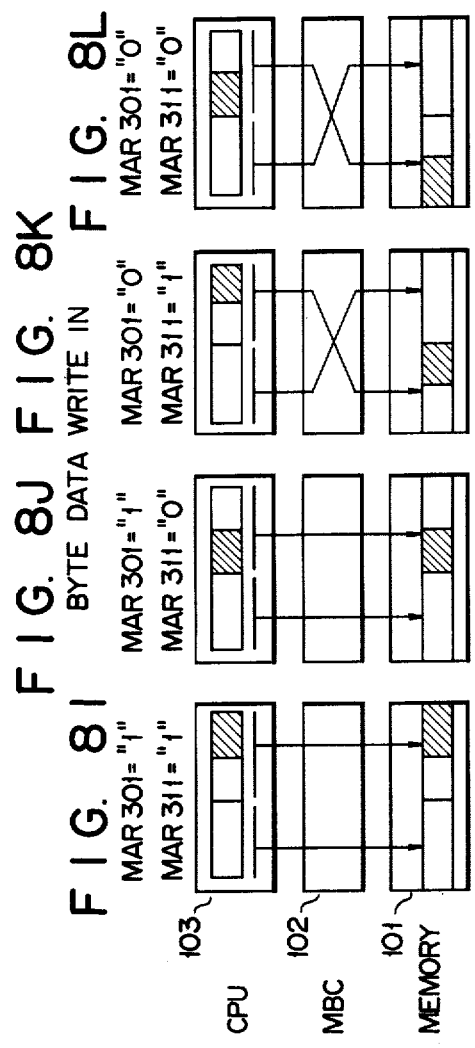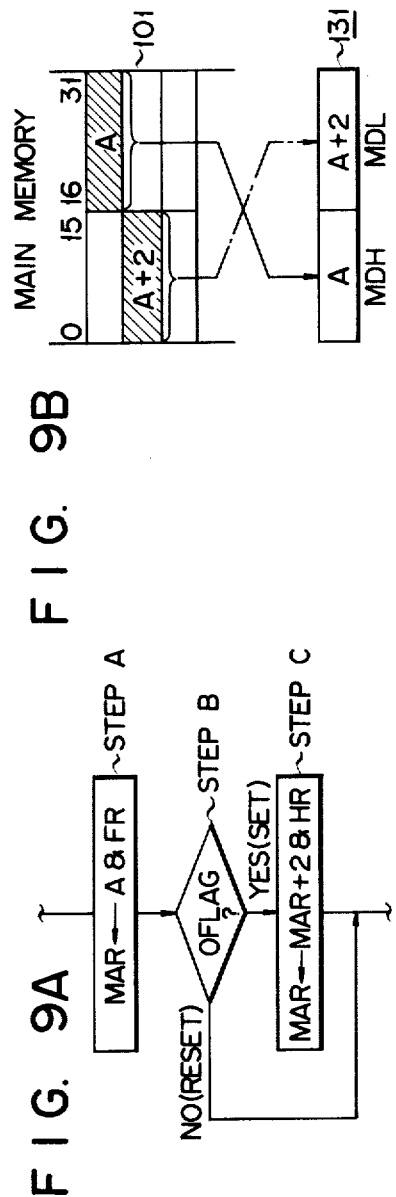

FIG. 10A
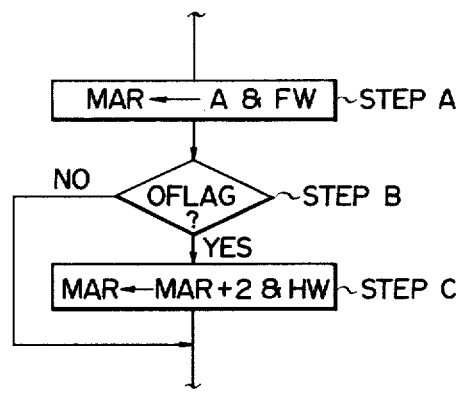
FIG. 10B
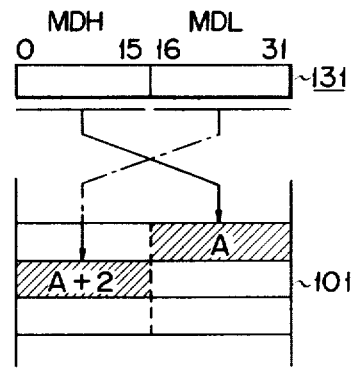
FIG. 13
| STATE | IBBSY | IFBSY | LOC 301 | INSTRUCTION IN IB | NEXT STATE |
|---|---|---|---|---|---|
| 0 | RESET | RESET | RESET | INSTRUCTION EXISTS IN IBH/IBL | 1 |
| 1 | RESET | RESET | RESET | INSTRUCTION EXISTS IN IBL | 2 |
| 2 | SET | SET | — | NO INSTRUCTION EXISTS IN IB BEING READ OUT | 0,1 |
| 3 | SET | RESET | — | NO INSTRUCTION EXISTS IN IB NOT READ OUT YET | 2 |

MEMORY CONTROL SYSTEM

BACKGROUND OF THE INVENTION

1. Field of the Invention

The present invention relates to a data processor in general, and in particular to a memory control system for a data processor for effectively processing an address boundary in a main memory unit.

In the field of data processing, the minimum unit of data bit length processed in an arithmetic control unit is defined as one address of the main memory unit. However, data practically processed in the arithmetic control unit frequently has a data length n times as long as the minimum unit length, n being an integer.

In a data processor in which the access unit length of data to the main memory is different from the processing unit length of an instruction word and data, an address boundary between full word data and half-word data in the main memory unit must be processed in some way. Many proposals for such address boundary processing have been made. In medium- and large-scale computers, a buffer memory is used as a means for high speed data processing. For this, address boundary processing in the form of hardware is frequently needed in a control section to control the buffer memory. For example, "COMPUTER ORGANIZATION" by Ivan Flores, 1969 describes on pages 262 to 272 an instruction readout processing method in connection with a relation of an instruction word length to a predetermined memory boundary.

In a small-scale computer, a buffer memory control section is undesirable since it introduces complexity and expense into the control section. To avoid this, the following measures have heretofore been taken in this type computer. (1). A restriction is placed on the position of the operand of an instruction stored in the main memory and the position of transaction data. (2). The operand data extending over an address boundary is reconstructed in the arithmetic control unit and then is processed.

Both measures, however, provide poor operating efficiency.

SUMMARY OF THE INVENTION

Accordingly, an object of the invention is to provide a memory control system for a data processor having a main memory in which the data length of one full word corresponds to one address, and which processes data having a data length n times as long as the half-word length, n being an integer. It is another object of the invention to provide such a memory control system in which the reading operation of an instruction word transferred from the main memory is speeded up. It is also an object of the invention to provide such a memory control system which processes an operand extending over an address boundary in the main memory.

To achieve the objects mentioned above, a memory control system is provided for a data processor according to the invention having a memory board for storing instructions and data on a word unit basis, a memory board controller connected to the memory board to control the same, and an operation controller connected to the memory board controller in which an instruction word read out from the memory board has a length n times as long as the half-word length, n being an integer. In the above-mentioned memory control system, the operation controller comprises: memory control means which is connected to the memory board controller and directs the read-out instruction or the write instruction of the memory board to the memory board controller; memory address control means which is connected to the memory board controller, and supplies an address signal for read-out or write purposes to the memory board controller; memory data control means which is bidirectionally connected to the memory board controller, the memory control means and the memory address control means, and controls data for writing into and reading out from the memory board; operation processing means which is bidirectionally connected to the memory data control means, and operates the data supplied from the memory data control means and transfers the result of the operation to the memory data control means; instruction execution control means which is bidirectionally connected to the memory control means, memory address control means, the memory data control means, and the operation processing means, and executes an instruction read out from the memory board so as to supply the control signal.

BRIEF DESCRIPTION OF THE DRAWINGS

Other objects and features of the invention will be apparent from the following description taken in connection with the accompanying drawings, in which:

FIG. 3 is a block diagram depicting the details of a memory address control portion of the embodiment of FIG. 1;

FIG. 4 is a block diagram depicting the details of a memory control portion of the embodiment of FIG. 1;

FIGS. 5A–5D illustrate formats of instruction words used in the embodiment of FIG. 1;

FIGS. 6A–6C illustrate formats of data words used in the embodiment of FIG. 1;

FIG. 7 is a memory map of data instruction words within a memory;

FIG. 8A illustrates zone control when full-word data is read out from a full-word boundary;

FIG. 8B illustrates zone control when full-word data is read out from a half-word boundary;

FIG. 8C illustrates zone control when half-word data is read out from the full-word boundary;

FIG. 8D illustrates zone control when half-word is read out from the half-word boundary;

FIG. 8E illustrates zone control when full-word data is written into the full-word boundary;

FIG. 8F illustrates zone control when full-word data is written into the half-word boundary;

FIG. 8G illustrates zone control when half-word data is written into the full-word boundary;

FIG. 8H illustrates zone control when half-word data is written into the half-word boundary;

FIG. 8I illustrates zone control when byte data is written in an even number address of the half-word boundary;

FIG. 8J illustrates zone control when byte data is written in an odd number address of the half-word boundary;

FIG. 8K illustrates zone control when byte data is written in an even number address of the full-word boundary;

FIG. 8L illustrates zone control when byte data is written in an odd number address of the full-word boundary;

FIGS. 9A and 9B diagramatically illustrate a read-out operation of full-word data begining with a half-word boundary;

FIGS. 10A and 10B diagramatically illustrate a write operation of full-word data begining at a half-word boundary.

FIG. 13 is a table tabulating corelation between flags and instruction states.

DETAILED DESCRIPTION OF THE PREFERRED EMBODIMENTS

Figure 1:
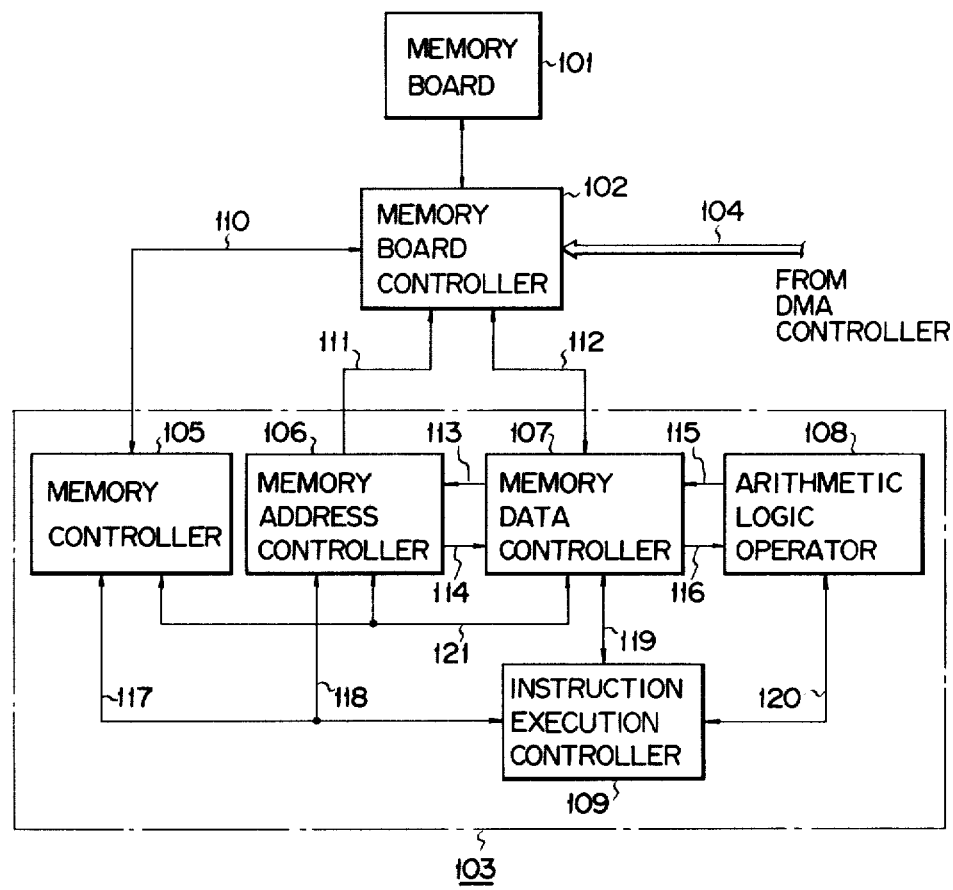
FIG. 1 is a block diagram depicting an embodiment of a memory control system according to the invention.

Reference is first made to FIG. 1 illustrating schematically an operation controller and a memory. A memory board 101 is a main memory unit for storing various kinds of instruction data on a word unit basis (in this example, one word = 32 bits = 4 bytes of 8 bits each). A memory board controller (memory control section) 102 connected to the memory board 101 controls the writing and the reading of data or instructions to and from the memory board 101. The memory board controller 102 is connected to an operation controller 103 and through a high speed bus (H-bus) 104 to a direct memory access controller (DMA controller) (not shown). The operation controller 103 includes a memory controller 105 a memory address controller 106, a memory data controller 107, an arithmetic logic operator 108 and, an instruction execution controller 109. The memory controller 105, the memory address controller 106, and the memory data controller 107 are coupled with the memory board controller 102, through bus lines 110, 111 and 112. The memory address controller 106, the memory data controller 107, and the arithmetic logic operator 108 are bidirectionally connected, through signal lines 113, 114, 115 and 116, as shown. Similarly, the instruction execution controller 109, the memory controller 105, the memory address controller 106, the memory data controller 107, and the arithmetic logic operator 108 are coupled bidirectionally, through bus lines 117, 118, 119, and 120, as shown. The memory controller 105, the memory address controller 106 and the memory data controller 107 also are bidirectionally connected, through a bus line 121.

Figure 2:
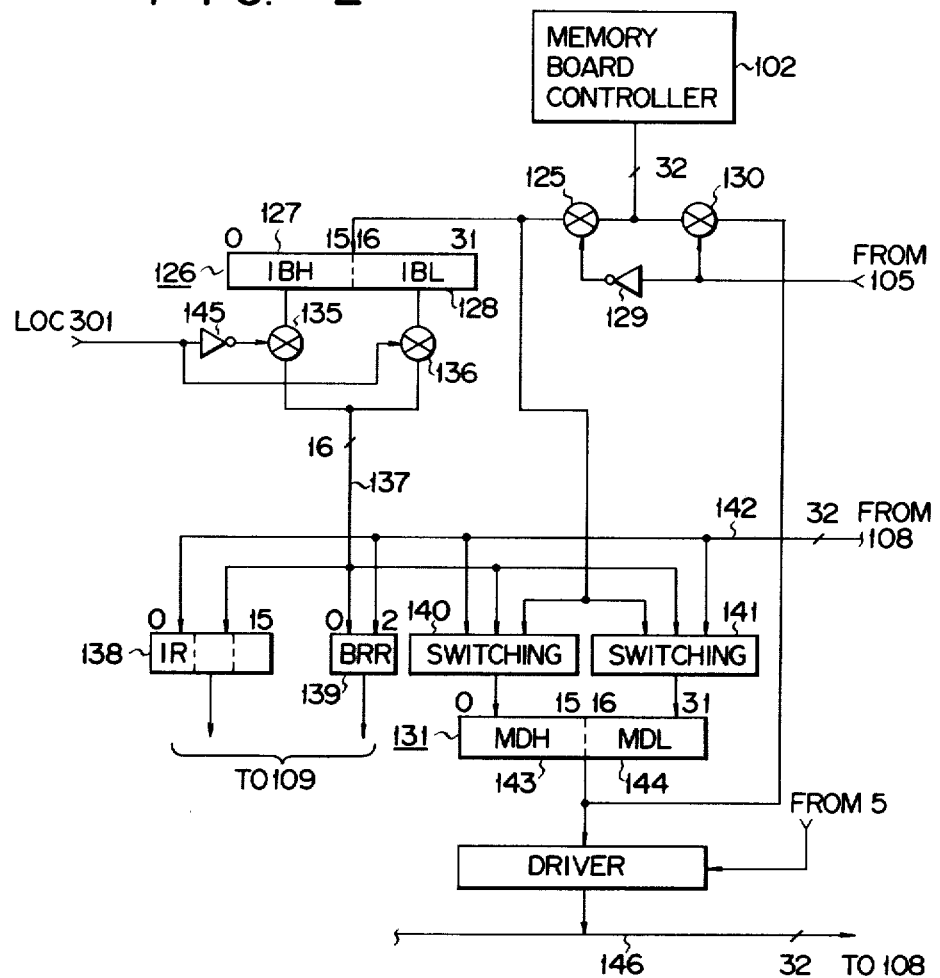
FIG. 2 is a block diagram depicting the details of a memory data control portion used in the embodiment in FIG. 1.

MEMORY DATA CONTROLLER (FIGS. 2 and 1)

FIG. 2 shows in detail the memory data controller 107. Data read out from the memory board 101 by the memory board controller 102 is set in an instruction buffer register 126, through a gate circuit 125. The instruction buffer register 126 is constructed by 32 bits, having a high (higher significant) portion (IBH) 127 (bits 0 to 15) and a low (lower significant) portion (IBL) 128 (bits 16 to 31). The gate circuit 125 is controlled to be in its opened and closed states by a signal transferred from the memory controller 105, through the bus line 121. A logical "0" signal coming from the memory controller 105 is inverted by an inverter 129 to be a logical "1" signal, which is applied to the gate 125 to open it. Upon the opening of the gate 125, data derived from the memory board controller 102 is transferred to the instruction buffer register 126, the memory board controller 102 executing a read-out operation. When the signal from the memory controller 105 is at a logical "1" level, it enables the gate 130. At this time, the gate 125 is disabled upon application thereto of a logical "0" signal from the inverter 129. As a result, data from a memory data register 131, which will be described below is loaded into the memory board 101, via the memory board controller 102. The data of IBH 127 and IBL 128 in the instruction buffer register 126 are outputted onto a bus line 137 of 16 bits (half-word), by way of gates 135 and 136. The data on the bus line 137 is applied to an instruction register IR 138, a base register designating register BRR 139, and first and second switching circuits 140 and 141. A control signal outputted from the arithmetic logic operator 108 is applied to the first and second switching circuits 140 and 141, by way of a bus line 142 of 32 bits (full-word). Data outputted from the IR 138 and BRR 139 are supplied to the instruction execution controller 109. The data derived from the first and second switching circuits 140 and 141 are applied to the high portion MDH (bits 0 to 15) and the low portion MDL (bits 16 to 31) 144 in the memory register 131.

The gate circuits 135 and 136 are controlled by the data 301 (FIG. 3) at the 30th bit in the instruction address register (LOC) within the memory address controller 106. To the gate circuit 135 is applied the data LOC 301 via an inverter 145, and to the gate circuit 136 is directly applied the data LOC 301. The output of the memory data register 131 is applied to the memory board controller through the gate circuit 130, and also is sent out onto a bus line 146 of 32 bits via a driver 145. The data on the bus line 146 is sent out to the arithmetic logic operator 108.

MEMORY ADDRESS CONTROLLER (FIGS. 3 and 1)

The memory address controller 106 has a memory address register MAR 151, a switching circuit 152 connected to the MAR 151, an instruction address register LOC 153 connected also to the switching circuit 152, and gate circuits 154 and 155 respectively connected to the MAR 151 and the LOC 153. The inputs of registers 151 and 153 are connected to the bus line 142 and are supplied with address data from the arithmetic logic operator 108. All bits from 0 to 31 from the register MAR 151 and bits 0 to 29 from the register LOC 153 are applied to the memory board controller 102, through switching circuit 152. The remaining bits 30 and 31 in the register LOC 153 are both set to logical "0". When both of the bits 30 and 31 are logical "0", the designation of the address is a full-word boundary as described below.

The switching circuit 152, depending on the control signal delivered from the instruction execution controller 109, selects either of the data from the registers 151 and 153. All the bits 0 to 31 in the registers MAR 151 and LOC 153 respectively are outputted onto the 32 bit bus line 146 through the gate circuits 154 and 155 the bus line 146 being routed to the arithmetic logic operator 108. The gate circuits 154 and 155 are controlled by control signals derived from the arithmetic logic operator 108.

MEMORY CONTROLLER (FIGS. 4 and 1)

Turning now to FIG. 4, there is shown a block diagram of the memory controller 105 having an instruction fetch controller 161, an operand read-out controller 162 interconnected with the instruction fetch controller 161, and an interface circuit 163 connected to the controllers 161 and 162.

To the instruction fetch controller 161 are applied an instruction fetch signal IF from the instruction execution controller 109 and the data LOC 301 of the bit 30 from the instruction address register 153. Upon receipt of those signals, the controller 161 produces an instruction fetch busy signal IFBSY and an instruction buffer busy signal IBBSY for transfer to the instruction execution controller 109. The instruction fetch busy signal is a flag indicating whether the next instruction to be executed is currently being fetched and the instruction buffer busy signal IBBSY is a flag indicating whether the next instruction to be executed is stored in the buffer register or not. The controller 161 delivers clock signals to the IB 126, the MDL 144 and BRR 139 included in the memory data controller 107 shown in FIG. 2.

The operand read-out controller 162 is supplied with an operand fetch signal OPF, a plurality of mode designating signals, and the data MAR 301 of the bit 30 in the MAR 151 (FIG. 3) from the instruction execution controller 109. As a consequence, the control circuit 162 delivers the operand fetch busy signal OFBSY and a half-word boundary flag OFLAG to the instruction execution controller 109.

The controller 162 also supplies clock signals to the MDH 143 and the MDL 144. The operand fetch busy signal OFBSY is a flag to indicate whether the next operand data to be executed is currently read out or not. The half-word boundary flag signal OFLAG is a signal indicating that the operand data starting from the half-word boundary has been handled.

FORMATS OF INSTRUCTIONS USED IN THE DATA PROCESSOR

Turning now to FIGS. 5A–5D, there are shown four formats of instructions used in the data porcessor according to the invention.

The type 1 format shown in FIG. 5A is an RR type, and is made up of 16 bits. In the format, bits 0 to 7 are assigned to an operation code field (OP) 171; bits 8 to 11 to a first operand field (R1) 172; bits 12 to 15 to a second operand field (R2) 173. The type 2 format shown in FIG. 5B is an RI type and is made up of 32 bits. Bits 0 to 7 are assigned to an operation code field (OP) 174; bits 8 to 11 to a first operand field (R1) 175; bits 12 to 15 to an index field (X) 176; bits 16 to 31 to a data field (I) 177. FIG. 5C shows another format of a 32 bit instruction, which is of an RX type, and donated as a type 3 having an operation code field (OP) 178 occupying bits 0 to 7, a first operand field (R1) 179 occupying bits 8 to 11, an address modification judging field 180 of bit 12, an index modification field (X) 181 occupying bits 13 to 15, and a memory address field (DISP) 182 occupying bits 16 to 31. FIG. 5D shows a type 4 format of a 32 bit instruction, which is also of the RX type, having an operation code field (OP) 183 ranging from bits 0 to 7, a first operand field (R1) 184 ranging from bits 8 to 11, an address modification determining field 185 in bit 12, an index modification field (X) 186 ranging from bits 13 to 15, a base modification field (B1) 187 ranging from bits 16–19 and a memory address field (188) (DISP) occupying bits 19 to 31.

The construction of the data words is divided into three types, as shown in FIGS. 6A–6C. Byte data 189 shown in FIG. 6A is comprised of 8 bits, half-word data 190 shown in FIG. 6B is comprised of 16 bits and full-word data 191 shown in FIG. 6C is comprised of 32 bits.

FIG. 7 shows states of instructions and data stored in the memory. As shown, byte data are stored in an address location (I) 201 ranging from bits 0 to 7, an address location (II) 202 from bits 8 to 15, an address location (III) 203 from bits 16 to 23, and an address location (IV) from bits 24 to 31. Half-word data and a type 1 instruction (FIG. 5A) are stored in an address location (V) ranging from bits 0 to 15 and an address location (VI) ranging from bits 16 to 31. Full-word data and types 2–4 instructions are stored in an address location (VII) ranging from bits 0 to 31, and an address location (VIII) lying over an address boundary, for example, ranging from the location bits 16 to 31 in one memory access area to the location bits 0 to 15 in the adjacent memory access area.

When such storing states of the instructions and half- and full-word data, the data zone control is made by the memory board controller 102 in accordance with the address boundary indicated by MAR 301 and MAR 311 data at bits 30 and 31, respectively, in the memory address register 151 (FIG. 3) when data is read out from the memory board 101 to the operation controller 103, and when data is loaded from the operation controller 103 into the memory board 101.

The zone control in the case of full-word data read-out is diagramatically illustrated in FIG. 8A. As shown, when full-word data is read out from the full-word boundary (when the data MAR 301 at bit 30 in the MAR 151 is "0"), the data (ranging from bits 0 to 31) stored in a given location of the memory board 101 is transferred, without being changed in any way, to the memory data register 131 (FIG. 2) within the memory data controller 107.

When full-word data is read out from the half-word boundary, the read-out address (A) and the full-word read-out command FR, in a step A, are transferred from the arithmetic logic controller 108, as shown in FIG. 9A. Further, "1" is set in the MAR 301 at the 30th bit of the MAR151 and the read-out from the half-word boundary is instructed. Upon this, the data in the specified address is read out from the memory board 101, as shown in FIGS. 8B and 9B, and the data is cross-shifted every half-word, under a condition (MAR 301 = "1") of half-word boundary with a full-word designation, and the half-word data ranging from bits 16 to 31 is transferred to the MDH143 (bits 0 to 15) in the memory data register 131.

In the case of a read-out from the half-word boundary, the OFLAG for storing a condition of full-word read-out and half-word boundary is set in the operand read-out controller 162 of the memory controller 105. As shown in FIG. 9A, setting of the OFLAG is determined in step B. If it is set, the contents of the memory address register are incremented by 2 in step C, and are also supplied with the half-word read-out command.

When half-word data is read out from full-word boundary (MAR301 = "0"), data read out from the memory board 101 is cross-shifted every half-word within the memory board controller 102 and is transferred to the MDL 144 (bits 16 to 31) in the memory data register 131. As a result, the data loaded at the preceding full-word read-out and the data presently being loaded at the half-word read-out are compounded to be full-word data which then is subjected to arithmetic operation. In the case of half-word data, the desired half-word data is transferred to the MDL 144 of the MDR 131, as shown in FIGS. 8C and 8D, under control of the memory board controller 102.

When half-word data is read out from the full-word boundary (MAR301="0"), data is cross-shifted within the memory board controller 102 and is transferred to the MDL144 of the memory data register 131 (See FIG. 8C).

When half-word data is read out from the half-word boundary (MAR301="1"), no control within the memory board controller 102 is performed and the data is transferred to the MDL144 of the memory data register 131 without being changed in any way. See FIG. 8D.

In writing data into the memory boundary 101, data flows in the opposite direction to that of data reading.

When full-word data is written from the full-word boundary into the memory, no control is carried out within the memory board controller 102 and the contents of the memory data register 131 are directly written into the memory board 101 (FIG. 8E).

When full-word data is written from the half-word boundary into the memory, the arithmetic logic operator 108 provides a write address into the memory address register 151, the full-word write command is issued, and "1" is set in the MAR301 at the 30th bit of the memory address register 151 and then writing of data from the half-word boundary to memory is instructed. As a result, data transferred from the memory data register 131 is cross-shifted within the memory board controller 102, as shown in FIGS. 8F and 10B. The cycle mode directed to the memory board 101 is switched from full-word to half-word and half-word writing to an address is executed within the memory board 101. At this time, the OFLAG flag for storing the condition is set in the operand read-out controller 162 in the memory controller 105. The instruction execution controller 109 determines whether the OFLAG flag is set or not, as indicated in a step B in FIG. 10A. When the OFLAG flag is set, the memory address register 151 is incremented by 2, as indicated in step C, and is supplied with the half-word write command HW. The result is that writing of half-word data is effected. At this time, if the MAR301 is "0", it indicates that half-word data is written from the full-word boundary into the memory, and therefore the contents of the memory data register 131 are cross-shifted every half-word in the memory board controller 102 and are written into the next half-word portion in the memory board 101.

When half-word data is written from the half-word boundary into the memory, MDL144 of the lower half-word portion of the memory data register 131 is directly transferred to the memory board 101, as shown in FIG. 8G and then is loaded into the lower half-word portion therein.

When half-word data is loaded into the full-word boundary, data is cross-shifted every half-word in the memory board controller 102 and is transferred to the memory board 101 where it is written into the upper half-word portion.

Byte data is written into the memory in the following two ways, depending on whether the address number is odd or even. In the case of an odd number address (when the data MAR311 at bit 31 in the memory address register 151 is "0", i.e. MAR311="0"), data is set in the lower 8 bits (from bits 24 to 31) of the lower half-word portion (MDL) in the memory data register 131). In the case of an even number address (when data MAR311 at bit 31 in the memory address register 151 is "1", MAR311="1"), data is set in the upper 8 bits (from bits 16 and 23) of the lower half-word portion (MDL) 144 in the memory data register 131. In the memory board controller 102, a control similar to that as in half-word data writing is performed and data is written into only the corresponding byte address in the memory board 101. More specifically, in the case of an odd number address (MAR311="1") with the half-word boundary (MAR301="1"), data ranging from bits 24 to 31 in MDL 144 is loaded into the corresponding address of the memory (FIG. 8I). In the case of an even number address (MAR311="0") with the half-word boundary (MAR311="0"), data from the bits 16 to 23 is written into the corresponding address of the memory (FIG. 8J). In the case of a full-word boundary (MAR301="0") and an odd number address (MAR311="1"), data from bits 24 to 31 of the MDL144 is cross-shifted and written into the location for bits 24 to 31 in the upper half-word portion of the memory (FIG. 8K). In the case of a full-word boundary (MAR301="0") and an even number address MAR311="0"), data from bits 16 to 23 of MDL144 is cross-shifted and written into an address location for bits 16 to 23 in the upper half-word portion of the memory. See FIG. 8L.

Figure 11:
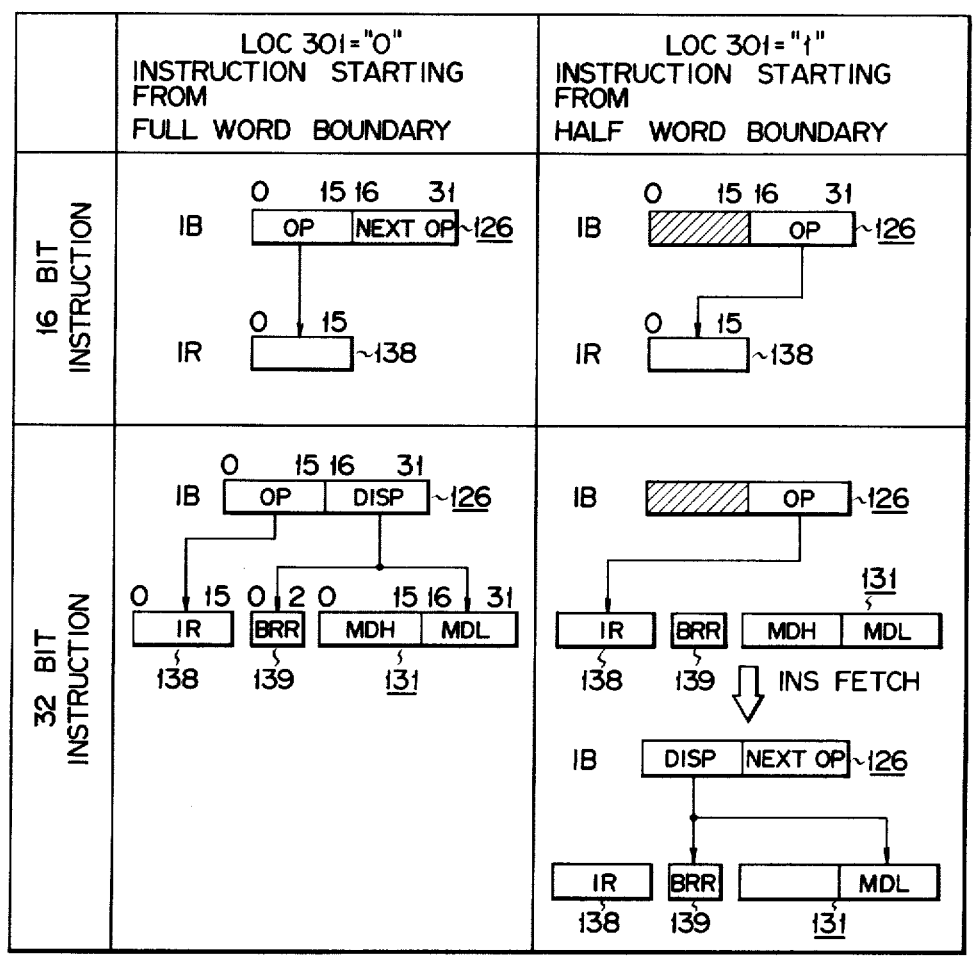
FIG. 11 diagramatically illustrates data flow of an instruction word.

Reference is made to FIG. 11 for the propose of illustrating the read-out control of instruction words. An instruction buffer register 126 is provided to effectively read out instruction words shown in FIG. 5. Half- and full-words are included in the instruction words. For reading them out, address information is sent into the memory board 101, through the instruction address register LOC153. The address information, of which the lower two bits 30 and 31 are deleted at this time, reads out a full-word of an instruction from the full-word boundary. The instruction read-out is temporarily stored in the buffer register 126. The buffer register 126 produces an output from the high and lower portions IBH 127 and IBL128 through buses, each for half-word transmission, to the instruction register 138, the base register designation register 139 and the lower half-word portion of a memory data register 131. Data LOC301 at the 30th bit of the instruction address register 153 determines which of the upper half-word portion IBH127 and the lower half-word portion 128 is coupled with the IB bus. This indicates that, when the LOC301 is "1", the present instruction address starts from the full-word boundary. The instruction stored in the IBH127 of the buffer register 126 is transferred to the instruction register 138. The instructions to be set in the IBL128 of the instruction buffer register 126 are as follows. In the case of an instruction starting from the full-word boundary, the contents LOC301 at the 30th bit of the instruction address register LOC153 is "0" and, in the memory data controller 107, the output signal of the inverter 145 loaded with the LOC301 becomes "1", enabling the gate circuit 135. At this time, the instruction read-out controller 105 produces a clock signal for operating the instruction buffer register 126 and an instruction set in the IBH 127 of the instruction buffer register 126 is set in the instruction register 138, via the gate circuit 135. In the case of an instruction of 16 bits starting from the half-word boundary, LOC301 from the instruction address register LOC153 is "1" and the gate circuit 136 of the memory data controller 107 is enabled. As a consequence, an instruction starting from the half-word boundary, which has been set in the IBL128 of the instruction buffer register 126, is transferred to the instruction register 138, through the gate circuit 136. When the 32-bit instructions of the type 2 to the type 4 start from the full-word boundary, LOC301 is initially "0". The upper 16-bit data set in IBH127 of the instruction buffer register 126 is transferred through the gate circuit 135 to the instruction register 138. Then, LOC301 becomes "1" and the lower 16-bit data, which has been set in IBL128 of the instruction buffer register 126 is transferred to the base register designation register 139, through the gate circuit 136, and also to MDL144 of the memory data register 131 through the switching circuit 141. In this case, in the base register designation register 139 is set base register designation data from bits 16 to 18 from the instruction buffer register 126.

In the case of a 32-bit instruction starting from the half-word boundary, LOC301 is "1" and 16-bit data having been set in the instruction buffer register 126 is set in the instruction register 138, through the gate circuit 136. After this, the instruction address register 152 is incremented by 2 so that the remaining half-word of the instruction and the next instruction are read out from the memory board 101 to the instruction buffer register 126. At this time, LOC301 becomes "0" and therefore the remaining instruction read out to IBH127 of the instruction register 126 is transferred to the base designation register 139 through the gate circuit 135 and also to MDL144 of the memory data register 131, through the switching circuit 141. As a result, a 32-bit instruction starting from the half-word boundary is set in MDL144 of the instruction register 138, the base register designation register 139 and the memory data register 131, thereby resulting in start of the instruction execution.

Figure 12:
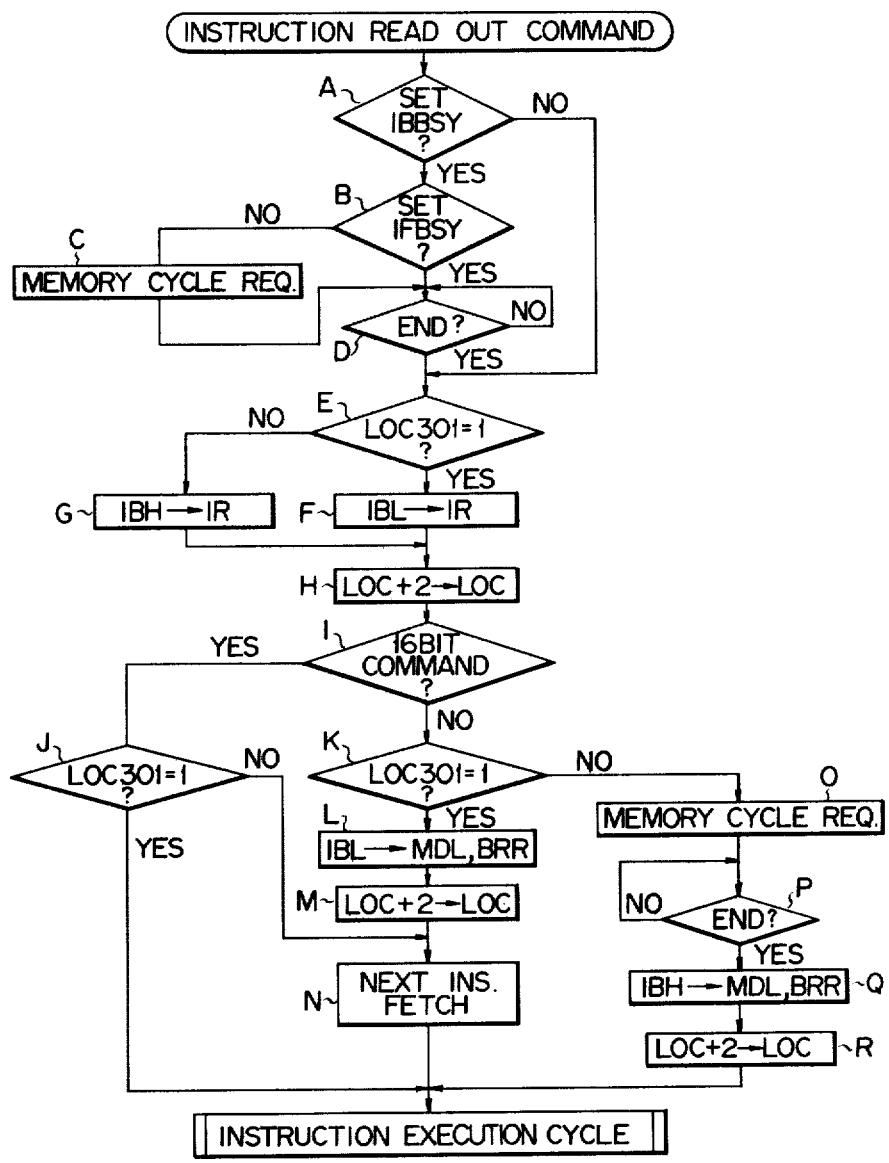
FIG. 12 is a flow chart illustrating control of the read-out of an instruction word.

The control operation of the instruction read-out will be described with reference to FIG. 12. The instruction read-out command is an instruction fetch (IF) signal produced at the end of the instruction word execution. In response to this, control starts. At the time the IF signal is generated, whether the flag IBBSY is set or not (indicating if an instruction word to next be executed exists or not in the instruction buffer register 126), as shown in a step A in FIG. 12. If the IBBSY flag is set, the read-out control process advances to a step B. The step B checks whether an IFBSY flag is set or not which is a flag indicating as to whether the read-out of the next instruction starts or not and is outputted from the instruction read-out controller 161. States of the instructions may be seen from set states of the IBBSY flag, IFBSY flag and the LOC301.

Turning now to FIG. 13, there is shown a table showing relationships among the states of IBBSY, IFBSY and LOC301, and instructions. As seen from the table, when IBBSY is set and IFBSY is reset, no instruction eixts in the instruction buffer register 126 and the read-out operation of the instruction of an instruction is still now performed. Accordingly, the read-out operation advances to a step C (FIG. 12) where a memory cycle is requested and an instruction is read out. When the IBBSY and IFBSY flags are both set, no instruction exists in the instruction buffer register 126 and the reading operation of the instruction now progresses. If the IFBSY flag is set in step B, the read-out control process advances to a step D where it stands by until the instruction reading operation ends. Upon the end of the instruction reading operation, a step E is executed. Also in case that the IBBSY flag is not set in step A, the control process advances to the step E. Step E judges whether the LOC301 is "1" or not. If the LOC301="1", the instruction is the one starting from the half-word boundary so that, in the next step F, the contents of IBL128 of the instruction buffer register 126 are transferred to the instruction register 138. On the other hand, when LOC301="0", the instruction is the one starting from the full-word boundary. Therefore, the contents of the IBH127 of the instruction buffer register 126 are transferred to the instruction register 138. As steps F and G end, the next step H increments by 2 the contents of the instruction address register 153 and then the control process advances to a step I. Step I determines whether the instruction is 16 bits or not. If it is a 16-bit instruction, the next step J is executed where it is determined whether the LOC301 is "1" or not. When LOC301="1", i.e. the instruction is the instruction starting from the half-word boundary, ending the reading operation of an instruction word, the read-out control enters an instruction execution cycle. In step I, if the instruction is not a 16-bit instruction, a step K determines if the LOC301 is "1" or not. When LOC301="1", a step L transfers the IBL128 in the instruction buffer register 126 to the base register designation register 139, and the MDL144 of the memory data register 131. In a step M, the contents of the instruction address register 153 is incremented by 2 and then the read-out control advances to a step N. Step N reads out the next instruction. In step J, when LOC="0", i.e. the instruction is an instruction starting from the full-word boundary, processing of step N is also executed. Following this, processing is performed in accordance with the instructions set in the instruction register 138, the MDL144 of the memory data register, and the base register designation register 139 in steps F and L. In step K, when LOC301="0", i.e. the instruction is the one starting from the full-word boundary, no instruction is in the instruction buffer register 126 and accordingly a step O requires a memory cycle. Then, in a step P, the control operation is in stand-by condition until the instruction read-out ends. Upon the end of the instruction, a step Q transfers the contents of the IBH127 of the instruction buffer register 126 to the MDL144 of the memory data register 131 and the base register designation register 139. Then, in a step R, the contents of the instruction address register 153 is incremented by 2 and the control enters an instruction execution cycle.

As described above, the present invention improves an operation unit in which data to be processed is loaded in the from of whole multiples of a half-word to a main memory unit with a unitary word construction in that simple hardware enables instruction words to be read out from the main memory at increased speed and to reliably process an operand extending over the address boundary.

What we claim is:

1. A memory control system for a data processing system in which the length of an access unit to a memory can be different from the lengths of information words which can include data, addresses, and instructions and operands processed in an arithmetic control apparatus, and combinations thereof, and in which an address boundary for effecting a read/write operation with respect to the memory of information words having a half-word length and a full-word length is processed comprising:

(A) first memory means for storing full-word length information words and for storing half-word length information words which correspond to 2n times a minimum unit word length, n being a positive integer, said first memory means having a full-word length boundary within which both full-word length and half-word length information words can be stored and a half-word length boundary within which half-word length information words can be stored and across which full-word length information words can be stored, said access unit length being said minimum unit word length;

(B) memory control means for controlling the read-/write operations of said first memory means including cross shifting full-word length information words when read from a half-word length boundary;

(C) memory data control means comprising,
  (a) an instruction buffer register for temporarily storing a half-word length information word or a full-word length information word from said first memory means through said memory control means,
  (b) an instruction register for storing an instruction from an information word in the instruction buffer register,
  (c) a base register designating register for storing data from an information word in the instruction buffer register, said data designating a base register for storing a base modification value for base-modifying an address,
  (d) first and second switching circuits for controlling a flow of information words from the instruction buffer register, and
  (e) a memory data register for temporarily storing an information word switched through one of said first and second switching circuits;

(D) arthmetic operating means bi-directionally coupled to said memory data control means for making computations from information in information words supplied from said memory data register and for supplying the results of computations to said first and second switching circuits, said base register designating register and said instruction register;

(E) memory address control means comprising,
  (a) a memory address register for storing address information of an information word from said arithmetic operating means,
  (b) an instruction address register for storing instruction address information of an information word from said arithmetic operating means, and
  (c) switching means for switching the output signal from the instruction address register to said memory control means; and (F) instruction execution control means coupled to said memory control means, said memory address control means, said memory data control means and said arithmetic operating means for executing an instruction in an information word fetched from said first memory means and for supplying a control signal to said memory control means, said memory address control means, said memory data control means and said arithmetic operating means.

2. A memory control system according to claim 1, in which said memory control means includes first and second memory control means which are bi-directionally coupled together, said second memory control means being bi-directionally coupled to said instruction execution control means, said memory address control means and said memory data control means, and said first memory control means being bi-directionally coupled to said first memory means, said second memory control means comprising:
  (a) instruction fetch control means for supplying a first flag signal representing the presence or absence in said instruction buffer register of an information word and a second flag signal representing whether a next information word is being fetched or not for supply to said instruction buffer register in order that an information word is always present in said instruction buffer register;
  (b) operand readout control means for supplying a third flag signal indicating processing of an information word starting at said half-word length boundary, and a fourth flag signal representing whether or not an information word next to be processed has been readout from said instruction buffer register; and
  (c) interface means coupled to said instruction fetch control means and said operand readout control means for interfacing with said memory control means.

3. A memory control system according to claim 1, in which an information word transferred from said first memory means to said instruction buffer register is a full-word length information word.

4. A memory control system according to claim 1, in which an information word transferred from said first memory means to said instruction buffer register is a half-word length information word.

5. A memory control system according to claim 1, in which said information word transferred from said first memory means through one of said first and second switching circuits to said memory data register is a full-word length information word containing operand data.

6. A memory control system according to claim 1, in which said information word transferred from said first memory means through one of said first and second switching circuits to said memory data register is a half-word length information word containing operand data.

7. A memory control system according to claim 1, in which said instruction buffer register is connected by a bus to said instruction register, the bus having a half-word length width.

8. A memory control system according to claim 2, in which said third flag signal is set when a full-word length information word starting from said half-word length boundary of said first memory means is fetched therefrom to said instruction buffer register, or when a full-word length information word is written into said first memory means starting from a half-word length boundary.

* * * * *